United States Patent
Wilson

[11] Patent Number: 5,918,406
[45] Date of Patent: Jul. 6, 1999

[54] WIGGLING FISHING LURE

[76] Inventor: Donald R. Wilson, 5672 Leon Rd., Nashville, N.C. 27856

[21] Appl. No.: 08/712,115

[22] Filed: Sep. 11, 1996

Related U.S. Application Data

[63] Continuation-in-part of application No. 08/420,120, Apr. 11, 1995, abandoned.

[51] Int. Cl.$^6$ .................................................. A01K 85/00
[52] U.S. Cl. ...................... 43/42.28; 43/42.43; 43/42.52; 43/42.29; 43/42.15
[58] Field of Search .................................. 43/42.5, 42.52, 43/42.37, 42.38, 42.32, 42.33, 42.34, 42.53, 42.25, 42.11, 42.15, 42.18, 42.24, 42.28, 42.29

[56] References Cited

U.S. PATENT DOCUMENTS

| | | | |
|---|---|---|---|
| 1,598,958 | 9/1926 | Crosby | 43/42.5 |
| 1,615,963 | 2/1927 | Stanley | 43/42.52 |
| 1,978,875 | 10/1934 | Wright | 43/42.52 |
| 2,119,805 | 6/1938 | Davenport | 43/42.52 |
| 2,157,414 | 5/1939 | Johnson | 43/42.43 |
| 2,516,399 | 7/1950 | Lovelace | 43/42.29 |
| 2,713,742 | 7/1955 | Holdaway | 43/42.38 |
| 2,833,079 | 5/1958 | Flaska | 43/42.34 |
| 3,405,475 | 10/1968 | Ross | 43/42.52 |
| 4,769,940 | 9/1988 | Doss | 43/42.5 |
| 5,261,182 | 11/1993 | Link | 43/42.37 |

*Primary Examiner*—Kurt Rowan

[57] ABSTRACT

A new and improved fishing lure which is specifically adapted for movement upon or within the water. The lure includes a first deflector having a straight first edge, a curved second edge, a concave surface, and a convex surface. Two apertures are centrally formed within the first deflector, with the two apertures functioning to secure the lure to a fishing line. A second deflector is employed which is formed from a straight first edge, a second edge, a concave surface, and a convex surface. The first straight edge of the first deflector is integral with the straight first edge of the second deflector such that the first deflector is positioned 90 degrees relative to the second deflector and the concave surfaces are situated adjacent each other. An aperture is formed within the second deflector. Furthermore, a baiting element is releasably connected to the aperture formed within the second deflector. Lastly, a fish hook is releasably connected to the aperture formed within the second deflector.

1 Claim, 6 Drawing Sheets

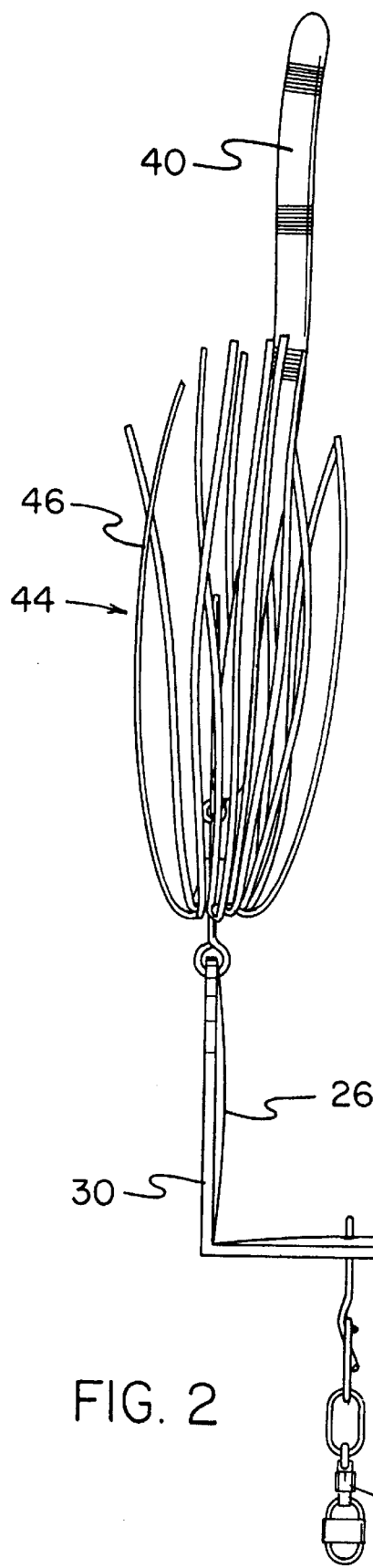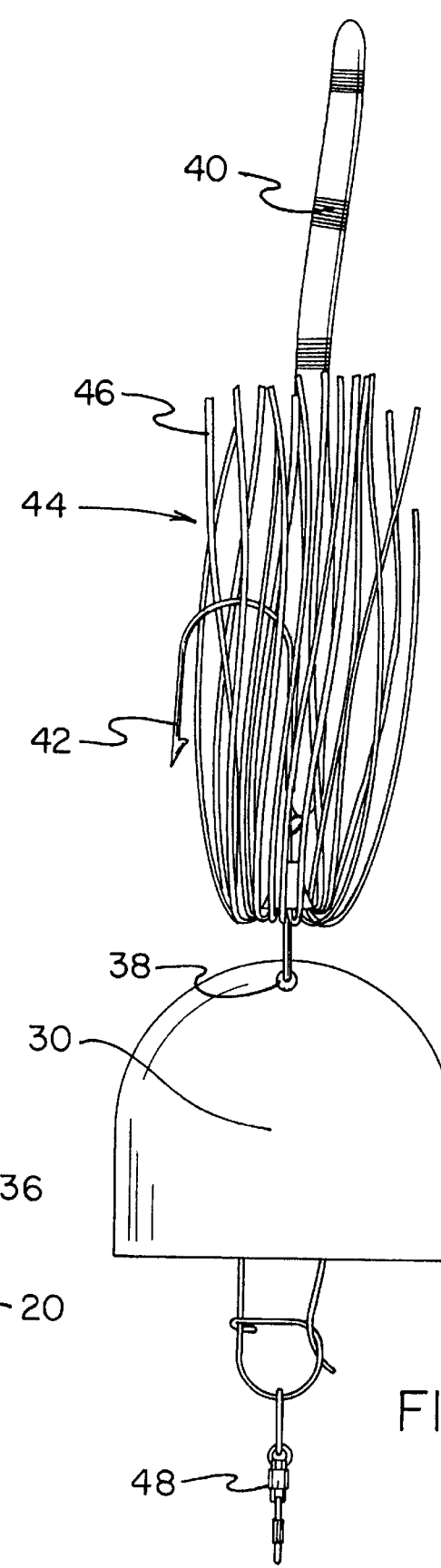

WIGGLING FISHING LURE

The present invention is a continuation-in-part of a co-pending application filed Apr. 11, 1995 under Ser. No. 08/420,120, now abandoned.

BACKGROUND OF THE INVENTION

1. Field of the Invention

The present invention relates to a wiggling fishing lure and more particularly pertains to such a lure with interchangeable parts and a uniquely designed deflector for effecting a wiggle upon the retrieval thereof.

2. Description of the Prior Art

The use of fishing lures is known in the prior art. More specifically, fishing lures heretofore devised and utilized for the purpose of attracting fish are known to consist basically of familiar, expected, and obvious structural configurations, notwithstanding the myriad of designs encompassed by the crowded prior art which has been developed for the fulfillment of countless objectives and requirements.

For example, U.S. Pat. No. 4,796,375 to Wilson discloses a sub-surface game fishing lure.

U.S. Pat. No. 5,201,784 to Mc Williams discloses a spinner bait fishing lure.

U.S. Patent to Sisson Jr. illustrates an artificial fishing lure.

U.S. Pat. No. 4,739,576 to Davis discloses a deep-diving fishing lure.

U.S. Design Pat. No. 341,183 to Fong illustrates a design for a diving fishing lure.

Lastly, U.S. Pat. No. 4,793,089 to Long et al. discloses a surface-type fishing lure.

In this respect, the wiggling fishing lure according to the present invention substantially departs from the conventional concepts and designs of the prior art, and in doing so provides an apparatus primarily developed for the purpose of attracting fish.

Therefore, it can be appreciated that there exists a continuing need for a new and improved wiggling fishing lure which affords a lure with interchangeable parts and a uniquely designed deflector for effecting a wiggle upon the retrieval thereof. In this regard, the present invention substantially fulfills this need.

SUMMARY OF THE INVENTION

In view of the foregoing disadvantages inherent in the known types of fishing lures now present in the prior art, the present invention provides an improved wiggling fishing lure. As such, the general purpose of the present invention, which will be described subsequently in greater detail, is to provide a new and improved wiggling fishing lure and method which has all the advantages of the prior art and none of the disadvantages.

To attain this, the present invention essentially comprises a new and improved fishing lure which is specifically adapted for movement upon or within the water. In its broadest context, the present invention relates to a fish lure which includes an L-shaped deflector, a baiting element releasably secured to one end of the L-shaped deflector, a fish hook releasably secured to one end of the L-shaped deflector, and a depending reflective skirt also releasably secured to one end of the deflector. The specific elements, and the manner in which they interrelate will be described in more detail hereinafter. The L-shaped deflector can be considered to be made up of two individual deflectors integrally connected with one another. The first deflector is formed from a straight first edge and a curved second edge. The first deflector is dished or curved between the first edge and the second edge. This curvature promotes the movement of the lure as it is pulled through or across water. In order to secure the lure to a fishing line two apertures are formed within the first deflector. These two apertures are preferably formed in a side-by-side relationship, parallel with the first edge. This arrangement of the apertures promotes a more stable arrangement as the lure is pulled through the water. The second deflector is very similar to the first deflector. Accordingly, the second deflector is formed from a straight first edge and a curved second edge. The second deflector is curved between the first edge and the second edge. This curvature of the second deflector promotes motion of the lure as it is being pulled through or across water. The straight first edge of the first deflector is formed integrally with the straight first edge of the second deflector. This union is such that the first deflector is positioned 90 degrees relative to the second deflector. An aperture is formed within the second deflector approximate the curved second edge. The first and second deflectors are constructed from the same material. The preferred material is one that is not buoyant and is somewhat water resistant. A rustproof metal or a heavy plastic both meet this criterion. In order to attract fish a baiting element is removably secured to the aperture of the second deflector. The baiting element can be any one of a wide variety known in the art. As is well known, different baiting elements attract different fish. Thus, the type of fish the operator is attempting to attract would govern which baiting element is employed. A wormlike baiting element is depicted in the illustrations. Furthermore, the releasable attachment between the baiting element and the second deflector can take the form of any technique known in the art, for example, an eyelet connection. Additionally, a fish hook is releasably connected to the aperture formed within the second deflector. Again, this releasable attachment can take any one of a variety of forms. Additional fish-attracting elements can be removably coupled to the lure. In the preferred embodiment, a skirt is attached over the fish hook and the baiting element. The skirt of the preferred embodiment is constructed from a plurality of depending reflective ribbons. These depending reflective ribbons serve to cover the fish hook. Furthermore, the reflective nature of the ribbons functions to attract fish to the lure. As with the hook and baiting element, the skirt is releasably connected to the aperture formed within the second deflector. In the preferred embodiment, this connection takes the form of a collar which is secured about the upper end of the fish hook. The plurality of reflective ribbons are in turn secured to the inner surface of the collar. Again, any number of other elements can be added to the lure or substituted for one of the elements previously described.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent of legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved wiggling fishing lure which has all the advantages of the prior art fishing lures and none of the disadvantages.

It is another object of the present invention to provide a new and improved wiggling fishing lure which may be easily and efficiently manufactured and marketed.

It is a further object of the present invention to provide a new and improved wiggling fishing lure which is of durable and reliable constructions.

An even further object of the present invention is to provide a new and improved wiggling fishing lure which is susceptible of a low cost of manufacture with regard to both materials and labor, and which accordingly is then susceptible of low prices of sale to the consuming public, thereby making such wiggling fishing lure economically available to the buying public.

Still yet another object of the present invention is to provide a new and improved wiggling fishing lure which provides in the apparatuses and methods of the prior art some of the advantages thereof, while simultaneously overcoming some of the disadvantages normally associated therewith.

Even still another object of the present invention is to provide a fishing lure with interchangeable parts.

Still yet another object of the present invention is to afford a unique wiggling of the lure by employing a specifically shaped L-shaped deflector.

Lastly, it is an object of the present invention to provide new and improved new and improved fishing lure which is specifically adapted for movement upon or within the water. The lure includes a first deflector having a straight first edge, a curved second edge, a concave surface, and a convex surface. Two apertures are centrally formed within the first deflector, with the two apertures functioning to secure the lure to a fishing line. A second deflector is employed which is formed from a straight first edge, a second edge, a concave surface, and a convex surface. The first straight edge of the first deflector is integral with the straight first edge of the second deflector such that the first deflector is positioned 90 degrees relative to the second deflector and the concave surfaces are situated adjacent each other. An aperture is formed within the second deflector. Furthermore, a baiting element is releasably connected to the aperture formed within the second deflector. Lastly, a fish hook is releasably connected to the aperture formed within the second deflector.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is a side elevational view of the fishing lure in accordance with the present invention.

FIG. 3 is a plan view of the fishing lure of the present invention.

The same reference numerals refer to the same parts through the various Figures.

DESCRIPTION OF THE PREFERRED EMBODIMENT

Figure 1:
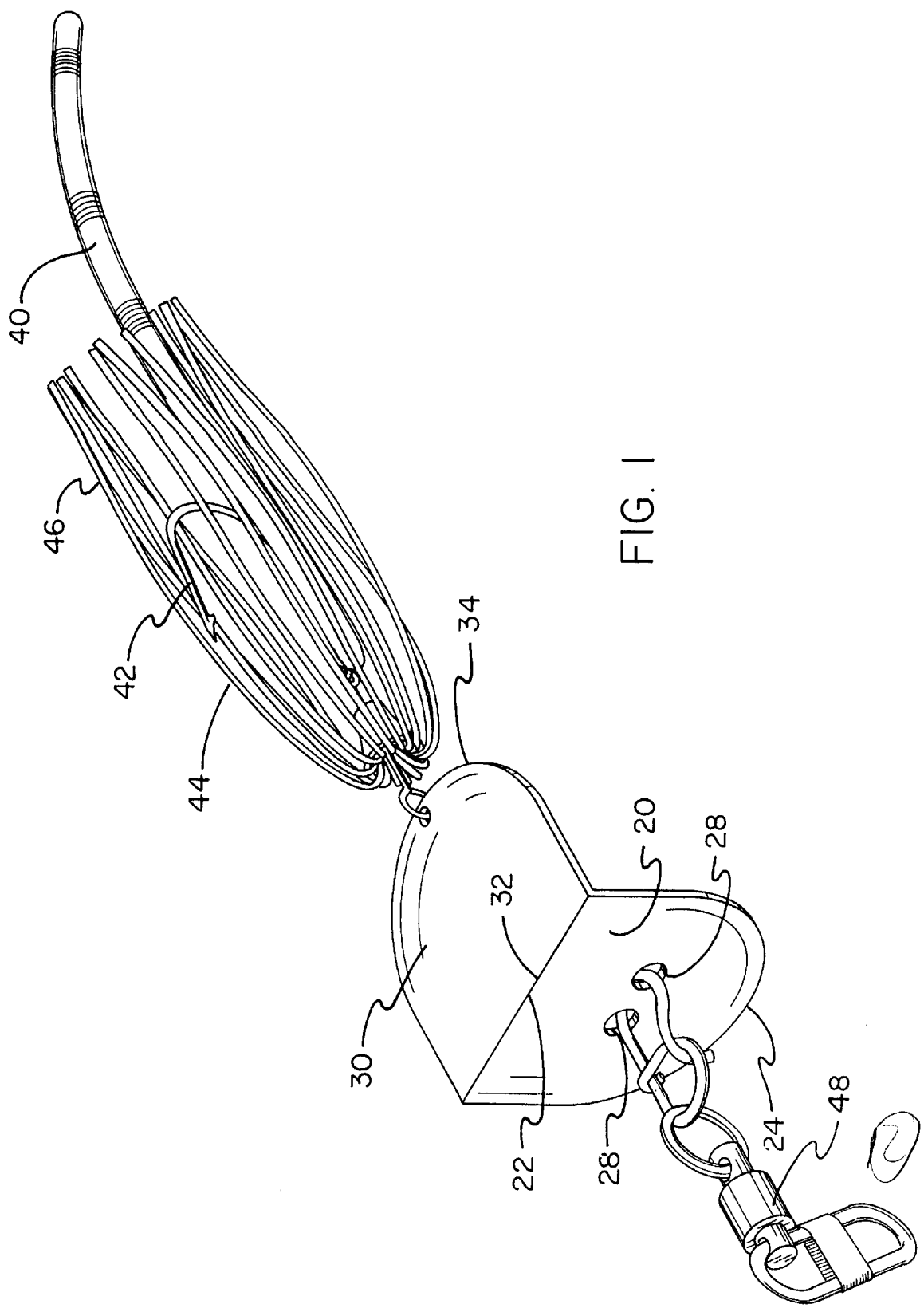
FIG. 1 is a perspective view of the preferred embodiment of the wiggling fishing lure constructed in accordance with the principles of the present invention.
Figure 4:
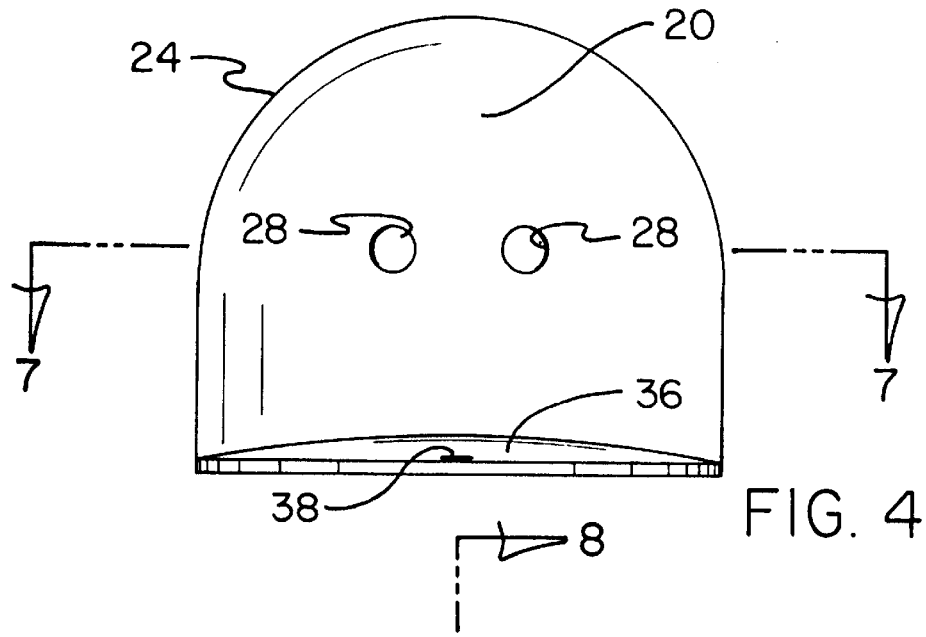
FIG. 4 is an elevational view of the L-shaped deflection member of the present invention.
Figure 5:
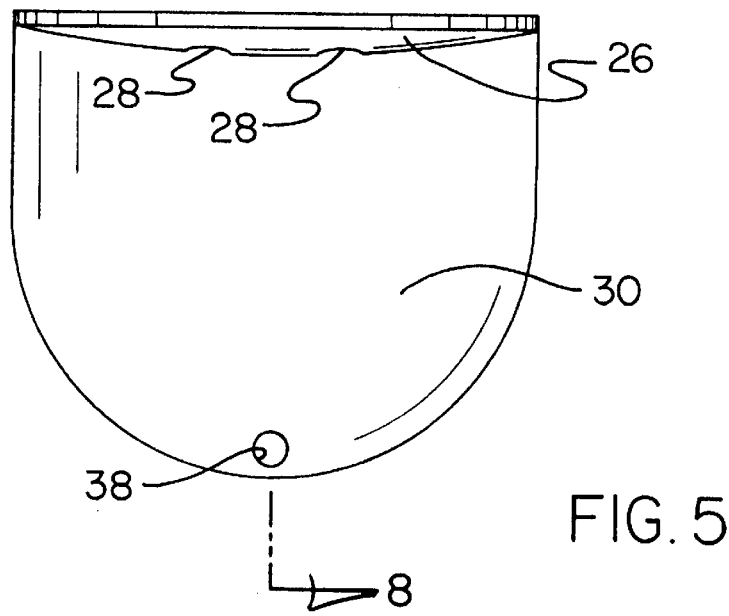
FIG. 5 is an elevational view of the L-shaped deflection member of the present invention.
Figure 6:
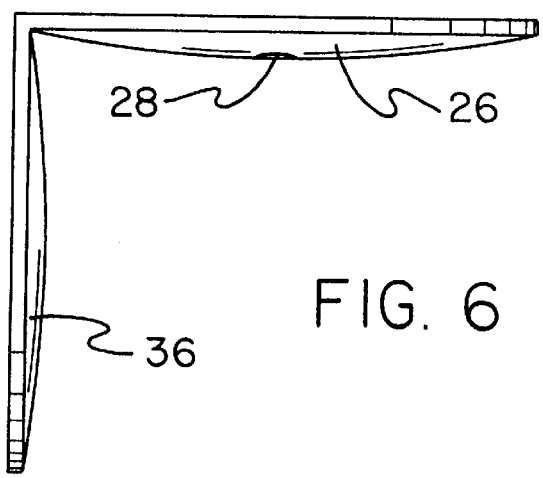
FIG. 6 is a side elevational view of the L-shaped deflection member of the present invention.
Figure 7:
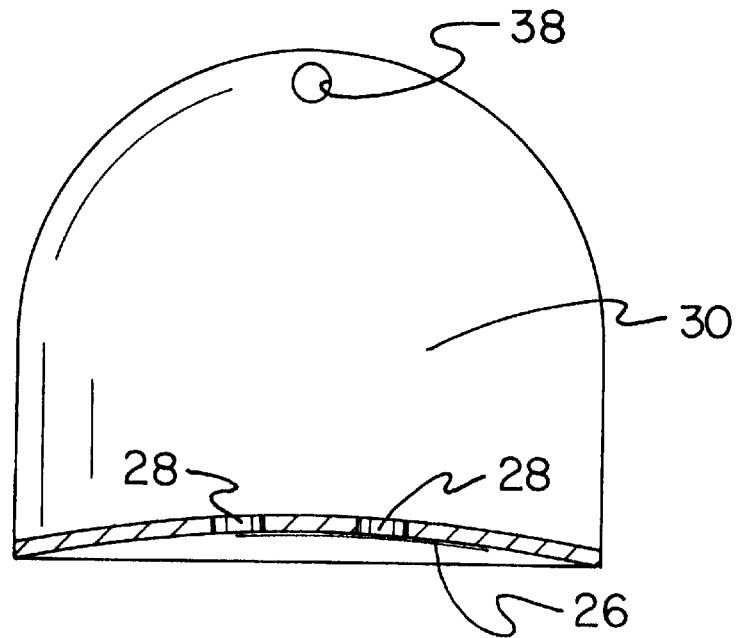
FIG. 7 is a view taken along line 7—7 of FIG. 4.
Figure 8:
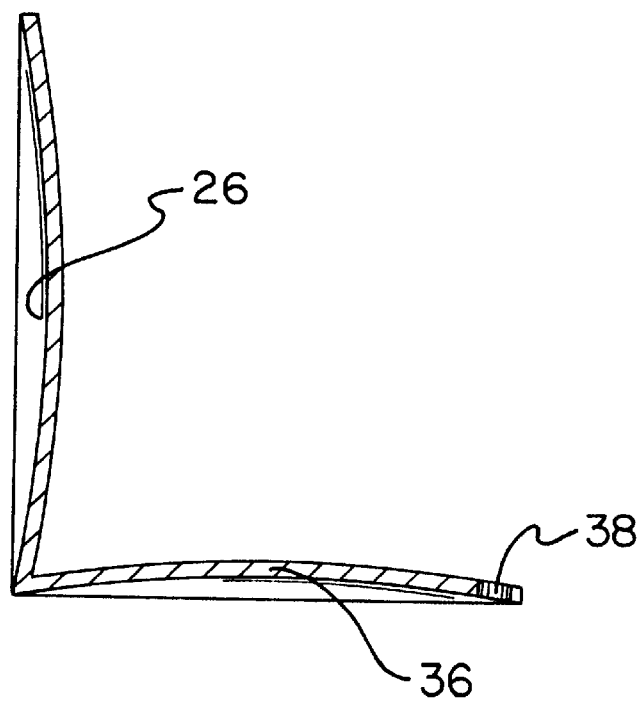
FIG. 8 is a view taken along line 8—8 of FIG. 5.

With reference now to the drawings, and in particular to FIG. 1 thereof, the preferred embodiment of the new and improved wiggling fishing lure embodying the principles and concepts of the present invention and generally designated by the reference numeral 10 will be described.

The present invention relates to a new and improved fishing lure which is specifically adapted for movement upon or within the water. In its broadest context, the present invention relates to a fish lure which includes an L-shaped deflector, a baiting element 40 releasably secured to one end of the L-shaped deflector, a fish hook 42 releasably secured to one end of the L-shaped deflector, and a depending reflective skirt 44 also releasably secured to one end of the deflector. The specific elements, and the manner in which they interrelate, will be described in more detail hereinafter.

The L-shaped deflector can be considered to be made up of two individual deflectors integrally connected with one another. The first deflector 20 is formed from a straight first edge 22 and a curved second edge 24. The first deflector 20 is dished or curved between the first edge and the second edge. As such, both a concave surface and a convex surface are defined. This curvature 26 promotes the movement of the lure as it is pulled through or across water. In order to secure the lure to a fishing line two apertures 28 are formed within the first deflector 20. These two apertures 28 are preferably formed in a side by side relationship, parallel with the first edge. This arrangement of the apertures promotes a more stable arrangement as the lure is pulled through the water.

The second deflector 30 is has size and shape identical to the first deflector 20. Accordingly, the second deflector 30 is formed from a straight first edge 32 and a curved second edge 34. The second deflector 30 is curved between the first edge and the second edge. As such, both a concave surface and a convex surface are defined. The curvature 36 of the second deflector 30 promotes motion of the lure as it is being pulled through or across water. The straight first edge 22 of the first deflector 20 is formed integrally with the straight first edge 32 of the second deflector 30. This union is such that the first deflector 20 is positioned 90 degrees relative to the second deflector 30 and the concave surfaces of the deflectors are adjacent each other on the same side of the L-shaped deflector. An aperture 38 is formed within the second deflector 30 approximate the curved second edge 34. The first and second deflectors are constructed from the same material. The preferred material is one that is not buoyant and is somewhat water resistant. A rustproof metal or a heavy plastic both meet this criterion.

In order to attach fish a baiting element 40 is removably secured to the aperture 38 of the second deflector 30. The baiting element 40 can be any one of a wide variety known in the art. As is well known, different baiting elements attract different fish. Thus, the type of fish the operator is attempting to attract would govern which baiting element 40 is employed. A wormlike baiting element 40 is depicted in the illustrations. Furthermore, the releasable attachment between the baiting element 40 and the second deflector 30 can take the form of any technique known in the art, for example, an eyelet connection. Additionally, a fish hook 42 is releasably connected to the aperture 38 formed within the second deflector 30. Again, this releasable attachment can take any one of a variety of forms.

Additional fish attracting elements can be removably coupled to the lure. In the preferred embodiment, a skirt 44 is attached over the fish hook 42 and the baiting element 40. The skirt 44 of the preferred embodiment is constructed from a plurality of depending reflective ribbons 46. These depending reflective ribbons 46 serve to cover the fish hook 42. Furthermore, the reflective nature of the ribbons functions to attract fish to the lure. As with the hook and baiting element 40, the skirt 44 is releasably connected to the aperture 38 formed within the second deflector 30. In the preferred embodiment, this connection takes the form of a collar which is secured about the upper end of the fish hook 42. The plurality of reflective ribbons 46 are in turn secured to the inner surface of the collar. Again, any number of other elements can be added to the lure or substituted for one of the elements previously described.

In an alternate embodiment 48, as shown in FIGS. 9–12, the convex surfaces of the deflectors have dimples 50 formed therein for promoting light reflection. Further, the second deflector is equipped with a second triangular edge 52 in lieu of a curved edge to give a varied wiggle in use. Similar to the first embodiment, the size of the second deflector is generally the same size as the first deflector. It should be noted that the first deflector of both embodiments as shown in use in FIG. 9, forms a 45 degree angle with the horizontal. Also, it is imperative that the concave surface of the first deflector is facing a floor of the body of water and the dimples of the upper convex surface face upwardly toward a surface thereof. As such, an optimal wiggle is afforded and light from the surface is able to reflect off the dimples.

Figure 9:
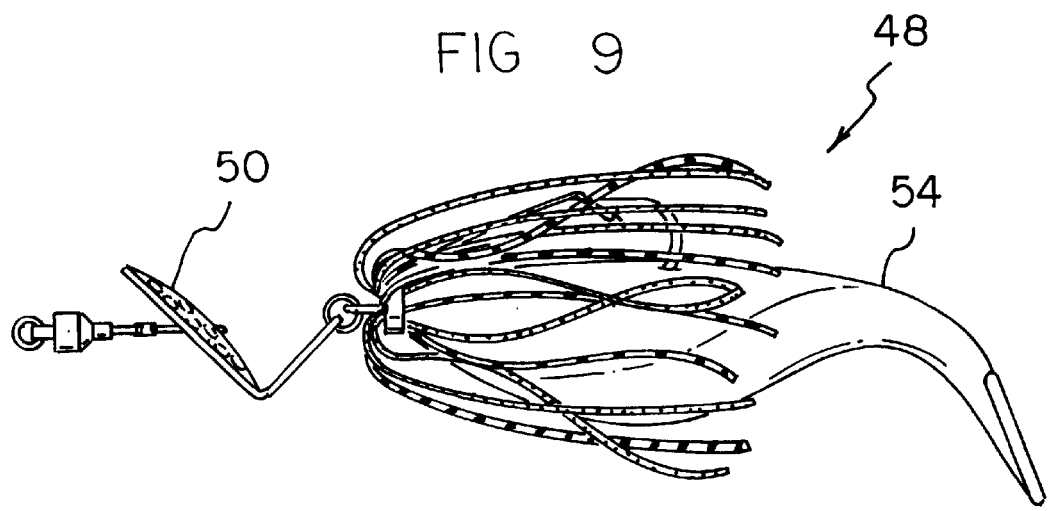
FIG. 9 is a side elevational view of an alternate embodiment of the present invention.

In the present embodiment, the baiting element comprises a fish like baiting element 54 including a front portion 56 residing generally within a vertical plane about the hook with a sharp end of the hook residing above a central extent of the baiting element. The fish like baiting element further includes a rear portion 58. As shown in FIG. 9, the rear portion includes a tail generally residing in a plane which forms about a 45 degree angle with the horizontal, whereby the first deflector resides in a plane parallel with the plane in which the tail of the baiting element during use.

Figure 11:
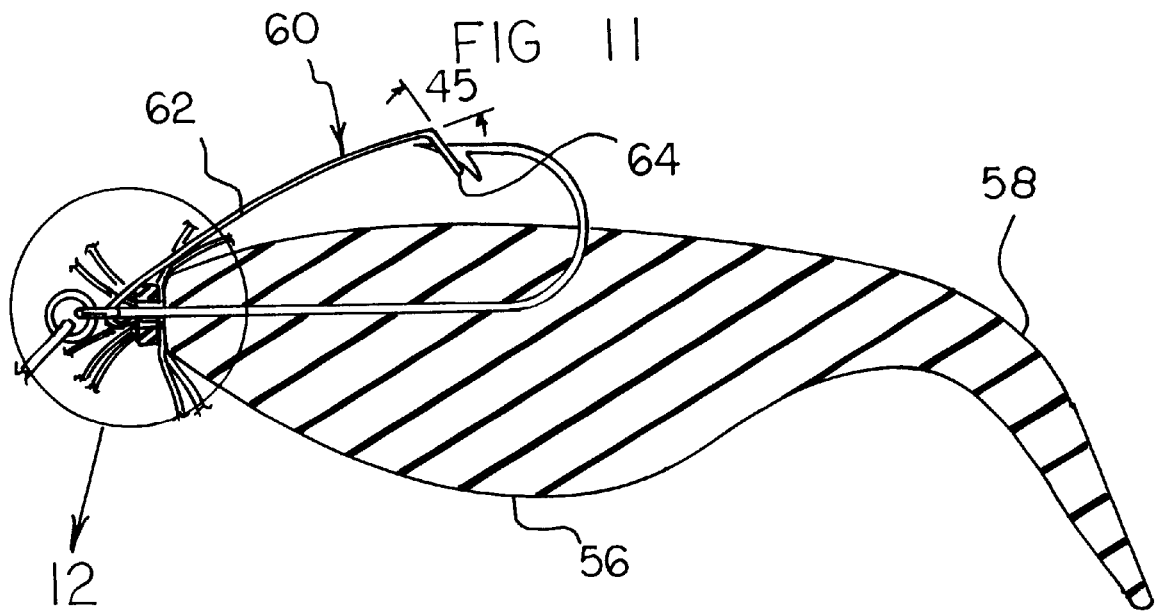
FIG. 11 is a cross-sectional view of the present invention taken along line 11—11 shown in FIG. 10.
Figure 12:
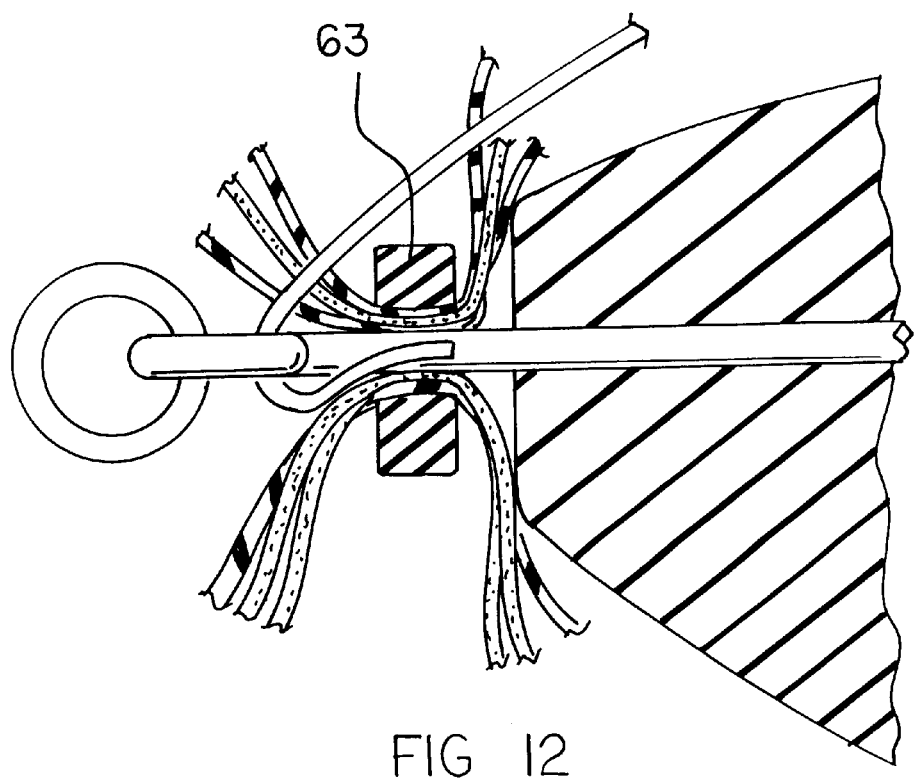
FIG. 12 is close-up view of the alternate embodiment shown in FIG. 11.

Further provided is a weed protection wire 60 having a pair of parallel wires with a linear extent 62 coupled at a first end thereof to the hook adjacent the aperture formed within the second deflector via an elastomeric ring 63. Such coupling is preferably afforded by the first end of the linear extent extending through a loop of the hook and bent to reside coaxially with the hook whereat the ring is secured about the hook and weed protection wire next to the loop of the hook. The weed protection wire further includes a skewed U-shaped extent 64 with a pair of wires integrally formed with a second end of the linear extent, as best shown in FIG. 11. Such U-shaped extent forms a 45 degree angle with the linear extent. The U-shaped extent further has an arcuate connecting member coupled between the wires thereof opposite the linear extent for engaging the hook in use. By this structure, the weed protection wire may be biased toward the baiting element during a strike by a fish.

Figure 10:
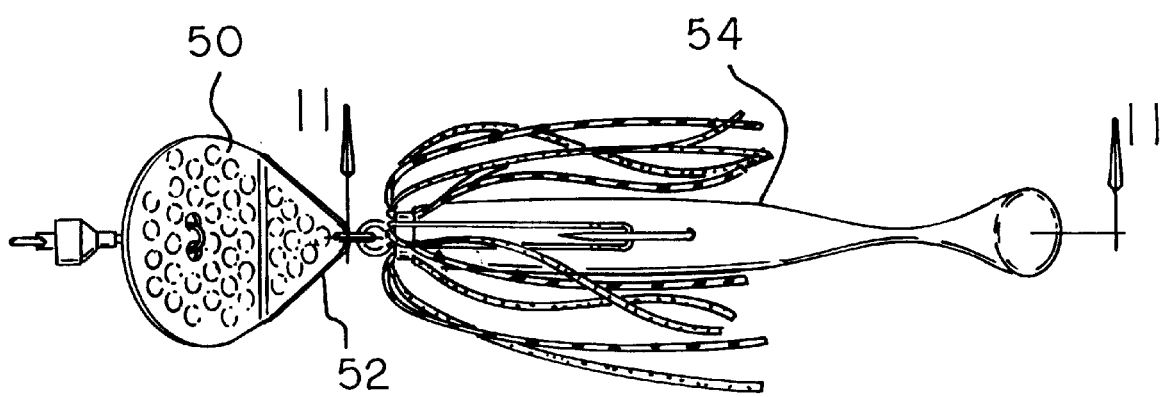
FIG. 10 is a top view of the alternate embodiment of the present invention.

In the alternate embodiment, the skirt is coupled to the hook adjacent the aperture formed within the second deflector via the ring which is situated about a midpoint of each ribbon. As shown in FIGS. 9 & 10, the skirt only extends half the length of the fish like baiting element.

In operation, an operator first determines the variety of fish that he or she is going after. A baiting element selection is made on the basis of this determination. Furthermore, any other elements can be added to the lure on the basis of this determination. The resultant elements are removably secured to the aperture within the second deflection element. The lure is then secured to the end of a fishing line by way of the two apertures within the first deflection element. Furthermore, the lure can be employed deep within the water, within shallow water, or even upon the surface of a body of water. Again, the determination of how the lure is employed is a function of the variety of fish one is attempting to attract. In any case, as the operator pulls the lure through the water, the curved surface of the first deflection element and the curved surface of the second deflection element impart motion to the lure. This side to side motion of the lure makes it even more attractive to hungry fish.

The fishing lure can be made to act in various ways, including moving back and forth, and in other manners which catch the attention of any kind of fish. The lure is relatively short, with the main component being a right angle metal deflector, with dimensions of 1¼ inches×½ of an inch. The surfaces are dished, promoting action and movement. Two holes are provided on the vertical portion for insertion of the snap that attaches it to the leader. A plastic worm at the rear is fitted with a choice of interchangeable skirts, concealing an eyelet and the hook, adding about 3–4 inches to the length of the lure. The configuration of this lure enables it to function very successfully when used in three ways. Reeled or trolled at a moderate speed, it is a top water attraction, wiggling back and forth. At a slower speed, it submerges but sill moves in the fascinating wiggle. When weights are added it will fish at the bottom. The wiggling action is most unique and is caused by the design of the right angle deflector and the loose method of attachment. This also causes light to flash off the polished surface, resembling a spinner or acting like crank bait. It has been successful in catching bass, catfish, gar and crappie, and should be attractive to other types.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved fishing lure which is specifically adapted for movement upon or within the water, the fishing lure comprising, in combination:

a metal first deflector having a straight first edge and a curved second edge, the first deflector being curved between the first edge and the second edge forming a convex surface and concave surface, two apertures formed within the first deflector, the two apertures functioning to secure the lure to a fishing line, the concave surface of the first deflector functioning to provide motion to the lure as it is pulled through a fluid medium;

a metal triangular shaped second deflector having a straight first edge and being curved forming a convex surface and a concave surface, the straight first edge of the first deflector being integral with the straight first edge of the second deflector such that the first deflector is positioned 90 degrees relative to the second deflector and the convex surfaces of the deflectors are adjacent each other, an aperture formed within the second deflector;

wherein the convex surfaces of the deflectors have dimples formed therein for promoting light reflection;

a fish hook having an eye and a shank terminating in a tip releasable connected to the aperture within the second deflector;

a baiting element having a length and mounted on said hook;

a weed protection wire having a pair of parallel wires with a linear extent coupled at a first end to the hook shank by an elastomeric ring, said parallel wires passing through said eye an extending back along said shank, said protection wire further including a skewed U-shaped extent with a pair of wires integrally formed with a second end of the linear extent and forming a 45 degree angle therewith, the U-shaped extent further having an arcuate connecting member for engaging said hook tip;

a skirt having a plurality of depending reflective ribbons, said plurality of depending reflective ribbons serving to cover the fish hook, the skirt being coupled to the hook adjacent said eye by said elastomeric ring situated about a midpoint of each ribbon wherein the ribbons extend ½ the length of the baiting element.

* * * * *